US012585156B2

(12) United States Patent
Shen et al.

(10) Patent No.: US 12,585,156 B2
(45) Date of Patent: Mar. 24, 2026

(54) BACKLIGHT MODULE

(71) Applicant: DARWIN PRECISIONS CORPORATION, Hsinchu County (TW)

(72) Inventors: Wen-Tai Shen, Hsinchu County (TW); Jia Wei Xu, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 18/616,226

(22) Filed: Mar. 26, 2024

(65) Prior Publication Data

US 2025/0028203 A1     Jan. 23, 2025

(30) Foreign Application Priority Data

Jul. 19, 2023    (TW) ................................. 112126926

(51) Int. Cl.
*G02F 1/13357*          (2006.01)

(52) U.S. Cl.
CPC .. *G02F 1/133611* (2013.01); *G02F 1/133603* (2013.01); *G02F 1/133605* (2013.01); *G02F 1/133606* (2013.01); *G02F 1/133608* (2013.01)

(58) Field of Classification Search
None
See application file for complete search history.

(56) References Cited

U.S. PATENT DOCUMENTS

| 7,929,213 B2 * | 4/2011 | Chang ............... | G02F 1/133606 |
| | | | 362/333 |
| 9,952,458 B2 * | 4/2018 | Yoshikawa ....... | G02F 1/133504 |
| 11,442,310 B2 * | 9/2022 | Sonobe ............ | G02F 1/133608 |
| 11,719,977 B2 * | 8/2023 | Huang .............. | G02F 1/133605 |
| | | | 362/97.1 |
| 11,933,999 B2 * | 3/2024 | Wang ................... | G02B 6/0053 |
| 2024/0027828 A1 * | 1/2024 | Kim .................. | G02F 1/133605 |
| 2024/0280243 A1 * | 8/2024 | Kusunoki ............ | F21V 7/0083 |

FOREIGN PATENT DOCUMENTS

| CN | 114967229 A | 8/2022 |
| TW | I283563 B | 7/2007 |
| TW | 201706686 A | 2/2017 |
| TW | M580691 U | 7/2019 |
| TW | 202024693 A | 7/2020 |
| TW | 202131070 A | 8/2021 |

* cited by examiner

*Primary Examiner* — Matthew J. Peerce

(57) ABSTRACT

A backlight module includes a reflective element, a plurality of light-emitting elements, and a light diffusion plate. The reflective element has a first surface, a second surface, and a plurality of light source grooves. The first surface is opposite to the second surface. The light source groove extends from the first surface to the second surface and has a light-emitting outlet on the first surface. The light-emitting elements are respectively disposed in the light source grooves. The light diffusion plate is disposed opposite to the first surface, where a distance between the light diffusion plate and the first surface is 0.5 mm to 4 mm.

9 Claims, 7 Drawing Sheets

1310a

1310b

1310c

1310d

100a

BACKLIGHT MODULE

FIELD OF THE INVENTION

The present invention relates to a light source module, and in particular to a backlight module.

BACKGROUND OF THE INVENTION

The liquid crystal display is mainly formed by a backlight module, a display panel, and an outer frame. Specifically, the backlight modules can be classified into edge-type backlight modules and through-type backlight modules. The surface light source of the through-type backlight module has the advantage of uniform brightness and is conducive to achieving local dimming function, allowing for a better image contrast ratio. Therefore, most large liquid crystal displays using light-emitting diodes (LEDs) as the light source are equipped with direct-lit backlight modules.

However, the conventional backlight modules are unable to effectively control the light-emitting angle of the light-emitting elements. Therefore, when the conventional backlight module performs local dimming, the light beam emitted from the bright region interferes with the adjacent dark region, thus affecting the display effect of the dark region and leading to a decrease in image contrast ratio.

SUMMARY OF THE INVENTION

The present invention provides a backlight module having the advantages of a small light-emitting angle and uniform luminance.

To achieve one or a portion of or all of the objects or other objects, the backlight module provided by the present invention includes a reflective element, a plurality of light-emitting elements, and a light diffusion plate. The reflective element has a first surface, a second surface, and a plurality of light source grooves. The first surface is opposite to the second surface. The light source grooves extend from the first surface to the second surface, and each of the light source grooves has a light-emitting outlet on the first surface. The light-emitting elements are respectively disposed in the light source grooves. The light diffusion plate is disposed opposite to the first surface, where a distance between the light diffusion plate and the first surface is 0.5 mm to 4 mm.

In an embodiment of the present invention, the aforementioned backlight module further includes, for example, a support element. The support element is fixed to the reflective element and abuts against the light diffusion plate so that the distance is formed between the light diffusion plate and the first surface.

In an embodiment of the present invention, the first surface has an outer edge, and the outer edge surrounds the light-emitting outlets. The support element may be fixed to the reflective element along the outer edge.

In an embodiment of the present invention, the support element and the reflective element may be formed integrally or separately.

In an embodiment of the present invention, a material of the support element and a material of the reflective element may include rubber, polycarbonate, polypropylene, or polyethylene terephthalate.

In an embodiment of the present invention, the light source groove includes a bottom portion and a reflective portion. The bottom portions are respectively opposite to the light-emitting outlets and are suitable for arranging the light-emitting elements. The reflective portion is located between the light-emitting outlet and the bottom portion and is suitable for surrounding the light-emitting element. The reflective portion includes a first reflective surface and a second reflective surface. The first reflective surface is located between the second reflective surface and the bottom portion, and the second reflective surface is located between the first reflective surface and the light-emitting outlet. A slope of the first reflective surface with respect to the second surface may be smaller than a slope of the second reflective surface with respect to the second surface, or a curvature of the first reflective surface may be greater than a curvature of the second reflective surface.

In an embodiment of the present invention, each of the light-emitting elements has a top surface and a bottom surface. The top surfaces are opposite to the bottom surfaces. The top surfaces respectively face the light-emitting outlets. Each of the top surfaces has a normal vector. An included angle between a peak angle of luminance of each of the light-emitting elements and the normal vector is 50 degrees to 90 degrees. A beam angle of the light-emitting elements is 140 degrees to 180 degrees.

In an embodiment of the present invention, the backlight module may further include a plurality of light-blocking elements. The light-emitting element has a top surface and a bottom surface. The top surface is opposite to the bottom surface and faces the light-emitting outlet. The light-blocking element is disposed on the top surface.

In an embodiment of the present invention, the included angle is, for example, 50 degrees to 70 degrees.

In an embodiment of the present invention, the beam angle of the light-emitting element is, for example, 140 degrees to 180 degrees.

In an embodiment of the present invention, each of the light-emitting elements has a top surface and a bottom surface. The top surfaces are respectively opposite to the bottom surfaces, face the light-emitting outlets and each have a normal vector. An included angle between a peak angle of luminance of the light-emitting element and the normal vector is-5 degrees to 5 degrees, and a beam angle of the light-emitting element is 120 degrees to 140 degrees.

In an embodiment of the present invention, there is a spacing between the two adjacent light-emitting outlets on the first surface, and the spacing is 0.01 mm to 2 mm.

In an embodiment of the present invention, the light diffusion plate has a light emitting surface and a light incident surface. The light emitting surface faces away from the first surface and is opposite to the light incident surface. The light emitting surface and/or the light incident surface comprises a plurality of optical microstructures.

In an embodiment of the present invention, each of the optical microstructures has an inclined surface. The inclined surface stands on the light emitting surface and/or the light incident surface and tilts with respect to the light emitting surface and the light incident surface. The two inclined surfaces of the two adjacent optical microstructures face each other and are adjacent to a connection line. An angle is formed between the two inclined surfaces and the angle ranges from 30 degrees to 150 degrees. The connection lines of the four adjacent optical microstructures intersect at a point, and the eight adjacent optical microstructures surround the point and are adjacent to each other.

In an embodiment of the present invention, shapes of the optical microstructures include triangular pyramid, quadrangular pyramid, triangular prism, cylinder, cone, or sphere.

In an embodiment of the present invention, the aforementioned backlight module further includes, for example, an optical film. The optical film is disposed on a side of the light diffusion plate facing away from the reflective element.

In summary, the backlight module of the present invention adopts a reflective element and a light diffusion plate. After being incident onto the reflective elements, the light beams generated by the light-emitting elements can be reflected by the reflective elements at a smaller light-emitting angle. In addition, because the distance between the first surface of the light diffusion plate and the reflective element is 0.5 mm to 4 mm, the light beam emitted from the reflective element is incident onto the light diffusion plate at a small angle, thus reducing the angle at which the light beam is emitted from the light diffusion plate. Based on the foregoing structure, the backlight module of the present invention has the advantages of a small light-emitting angle and uniform light-emitting brightness, thereby increasing the bright-dark contrast ratio when the backlight module performs local dimming.

Other objectives, features, and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1:
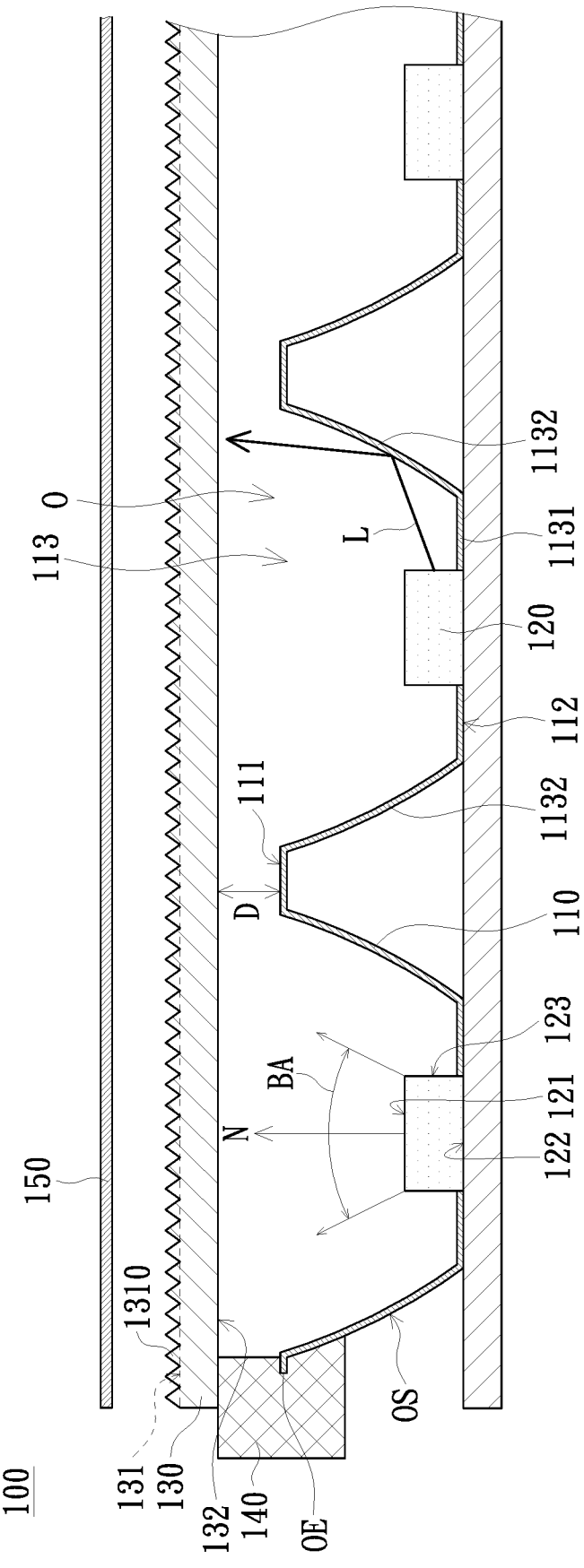
FIG. 1 is a schematic cross-sectional view of a backlight module according to an embodiment of the present invention.
Figure 2:
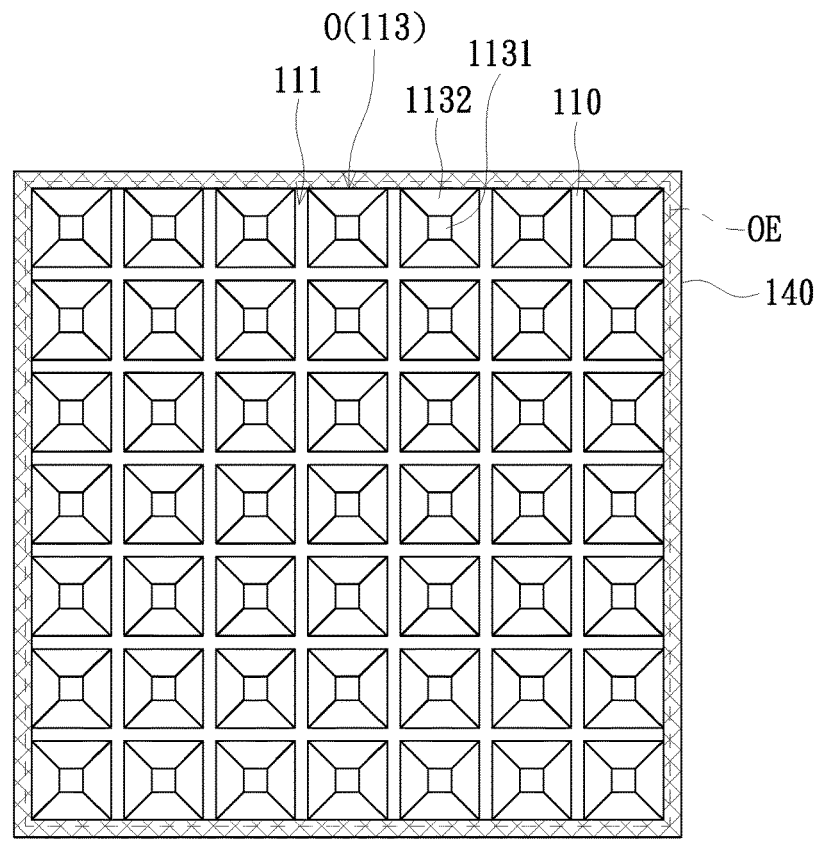
FIG. 2 is a schematic top view of a reflective element and a support element in FIG. 1.

FIG. 1 is a schematic cross-sectional view of a backlight module according to an embodiment of the present invention. FIG. 2 is a schematic top view of a reflective element and a support element in FIG. 1. Referring to FIGS. 1 and 2, a backlight module 100 includes a reflective element 110, a plurality of light-emitting elements 120, and a light diffusion plate 130. The reflective element 110 has a first surface 111, a second surface 112 (shown in FIG. 1), and a plurality of light source grooves 113. The first surface 111 is opposite to the second surface 112. The light source grooves 113 extend from the first surface 111 to the second surface 112 and each have a light-emitting outlet O on the first surface 111. The light-emitting elements 120 are respectively disposed in the light source grooves 113. The light diffusion plate 130 is disposed opposite to the first surface 111, where a distance D between the light diffusion plate 130 and the first surface 111 is 0.5 mm to 4 mm.

Figure 3:
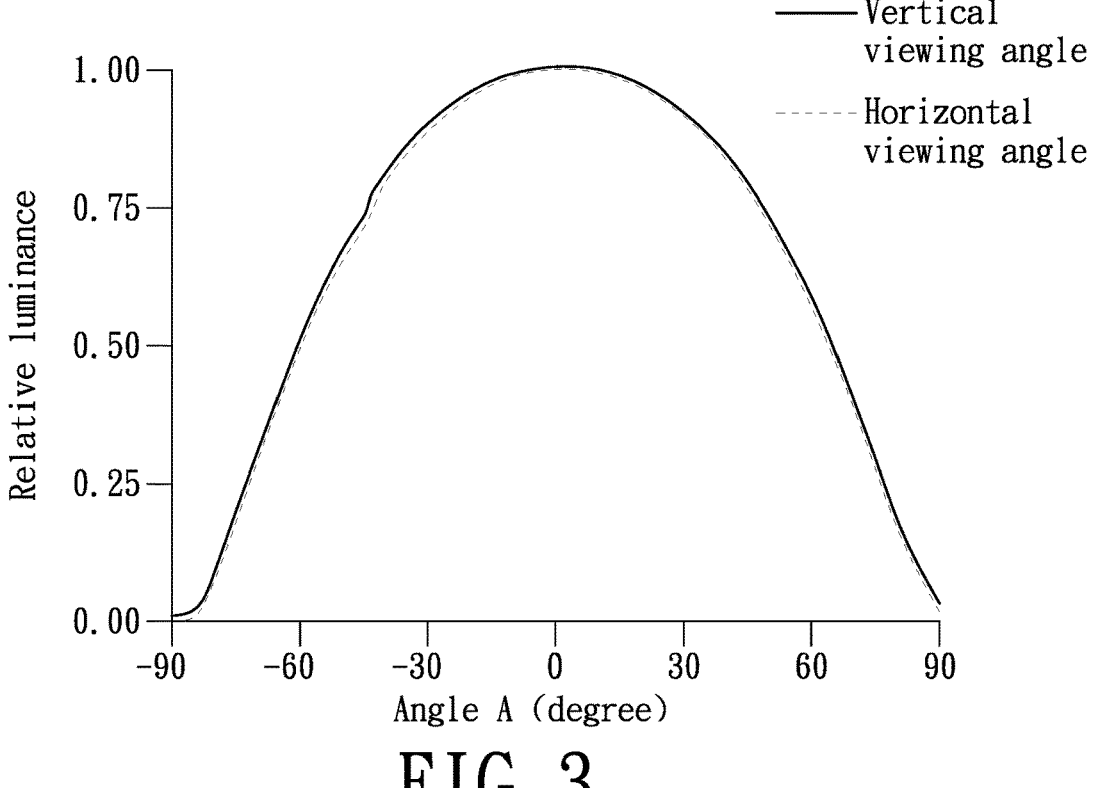
FIG. 3 is a schematic diagram of a light pattern distribution of the light-emitting element in FIG. 1 at a horizontal viewing angle and a vertical viewing angle.
Figure 4:
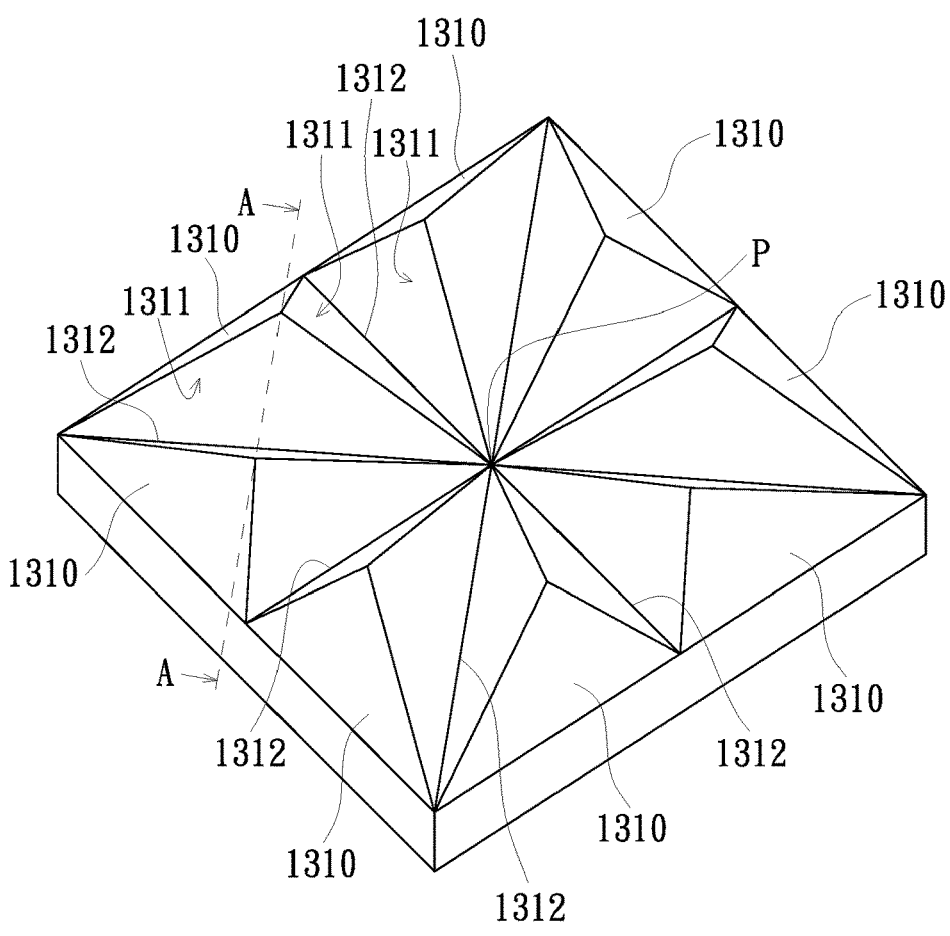
FIG. 4 is a schematic three-dimensional diagram of an optical microstructure of a backlight module according to another embodiment of the present invention.
Figure 5:
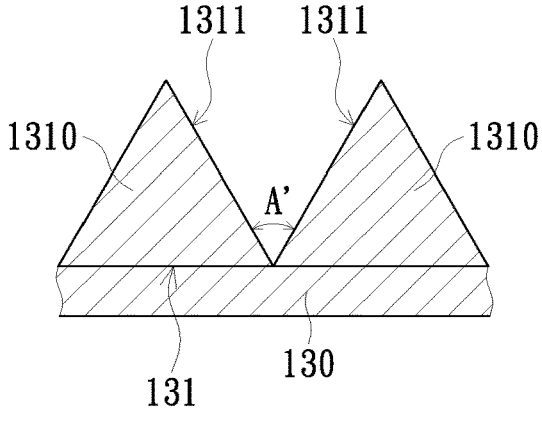
FIG. 5 is a schematic cross-sectional view of the optical microstructure, taken along line A-A in FIG. 4.

FIG. 3 is a schematic diagram of a light pattern distribution of the light-emitting element in FIG. 1 at a horizontal viewing angle and a vertical viewing angle. Still referring to FIG. 1 first, the light-emitting element 120 may include light-emitting diodes (LEDs). In an embodiment, the light-emitting element 120 may be a light-emitting chip cut from a wafer and not yet encapsulated, such as a light-emitting diode chip. For example, the light-emitting diode chip may be a granular-level nitride light-emitting diode chip that emits blue light at its main wavelength, but the present invention is not limited to this. Referring to FIGS. 1 and 3 together, in this embodiment, the light-emitting element 120 may have a top surface 121 and a bottom surface 122. The top surface 121 is opposite to the bottom surface 122 and faces the light-emitting outlet O. The top surface 121 has a normal vector N, an included angle between a peak angle of luminance of the light-emitting element 120 and the normal vector N may be −5 degrees to 5 degrees, and a beam angle BA of the light-emitting element 120 may be 120 degrees to 140 degrees. In this way, the light beam L generated by the light-emitting element 120 can be emitted from the light-emitting outlet O at a smaller angle, and the brightness of the light beam L emitted from the light-emitting outlet O is more uniform, thereby further increasing the bright-dark contrast ratio when the backlight module 100 performs local dimming. In addition, the use of the light-emitting element 120 can further improve the light-emitting brightness of the backlight module 100 and reduce the cost of the backlight module 100. In an embodiment, the included angle between the peak angle of the light-emitting element 120 at the horizontal viewing angle and vertical viewing angle and the normal vector N may be about 0 degrees, but the other embodiments are not limited thereto. Incidentally, in an embodiment, a side surface 123 of the light-emitting element 120 may be surrounded and blocked by a frame (not shown). Further, the material of the frame can be a light-transmitting material or an opaque material, but the other embodiments are not limited thereto. However, in another embodiment, the frame may be omitted to expose the side surface 123 of the light-emitting element 120.

Referring to FIG. 1 again, the light diffusion plate 130 may allow the light beam L generated by the light-emitting element 120 to be incident thereon. In this embodiment, the light diffusion plate 130 may have a light emitting surface 131 and a light incident surface 132. The light emitting surface 131 faces away from the first surface 111 and is opposite to the light incident surface 132. Referring to FIGS.

1 and 4 together, the light emitting surface 131 and/or the light incident surface 132 may have a plurality of optical microstructures 1310. In this way, the brightness of the light beam L emitted from the light emitting surface 131 can be more uniform. For example, referring to FIGS. 6 and 7, each optical microstructure 1310 may have an inclined surface 1311. The inclined surface 1311 stands on the light emitting surface 131 and/or the light incident surface 132, and the inclined surface 1311 stands, for example, on the light emitting surface 131 in this embodiment. The inclined surface 1311 tilts with respect to the light emitting surface 131 and the light incident surface 132. The inclined surfaces 1311 of the two adjacent optical microstructures 1310 face each other and both are adjacent to a connection line 1312. An angle degree A' is formed between the two adjacent inclined surfaces 1311 and the angle degree A' ranges from 30 degrees to 150 degrees. The two connection lines 1312 of the four adjacent optical microstructures 1310 intersect at a point P, and the eight adjacent optical microstructures 1310 surround the point P and are adjacent to each other. In this way, the light emitting uniformity of the light diffusion plate 130 can be further improved, thereby improving the optical quality of the backlight module 100. In addition, because the light diffusion plate 130 can make the light emit more uniformly, it can also reduce the distance between the light diffusion plate 130 and the light-emitting element 120, thereby reducing the thickness of the backlight module 100. On the other hand, because the light diffusion plate 130 can make the light emit more uniformly, it can also increase the distance between the light-emitting elements 120, thereby reducing the cost of the backlight module 100.

Figure 6:
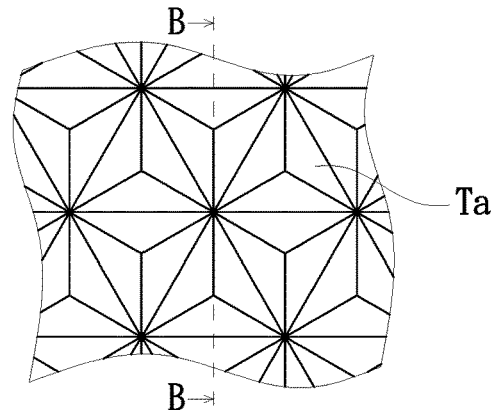
FIG. 6 is a schematic top view of an optical microstructure of a backlight module according to another embodiment of the present invention.
Figure 7:
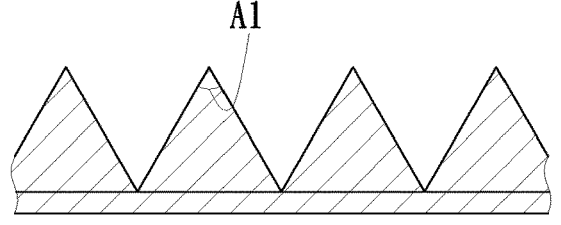
FIG. 7 is a schematic cross-sectional view of the optical microstructure, taken along line B-B in FIG. 6.
Figure 8:
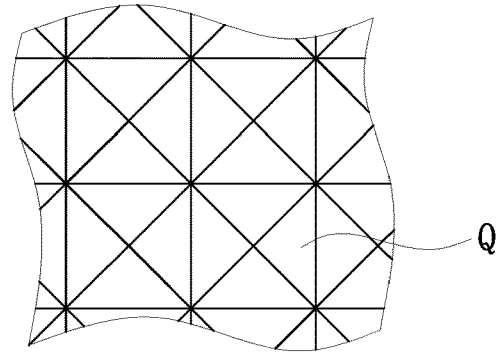
FIG. 8 is a schematic top view of an optical microstructure of a backlight module according to another embodiment of the present invention.
Figure 9:
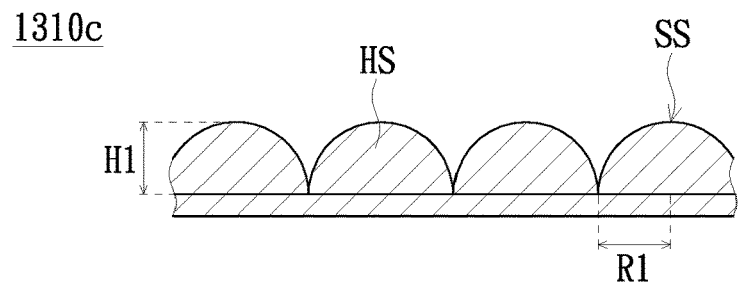
FIG. 9 is a schematic cross-sectional view of an optical microstructure of a backlight module according to another embodiment of the present invention.
Figure 10:
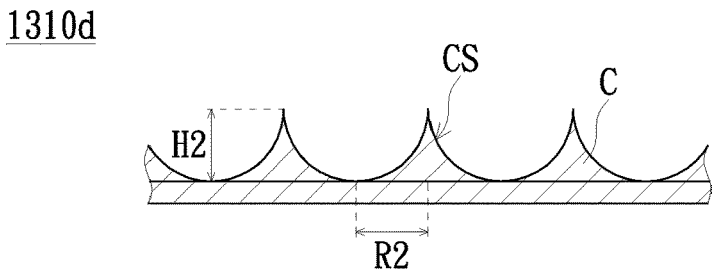
FIG. 10 is a schematic cross-sectional view of an optical microstructure of a backlight module according to another embodiment of the present invention.

It can be understood that the shape of the optical microstructure 1310 is not limited to that shown in FIG. 6. In other embodiments, the shape of the optical microstructure may include a triangular pyramid, a quadrangular pyramid, a triangular prism, a cylinder, a cone, or a sphere. For example, as shown in FIG. 6, each optical microstructure 1310a may include a triangular pyramid Ta, and the triangular pyramids Ta may be arranged closely to each other. Further, referring to FIG. 7, an angle A1 of the apex of each triangular pyramid Ta may range from 30° to 150°, but the other embodiments are not limited thereto. In another embodiment, for example, as shown in FIG. 8, each optical microstructure 1310b may include a quadrangular pyramid Q, and the quadrangular pyramids Q may be arranged closely to each other. In addition, referring to FIG. 9, each optical microstructure 1310c may include a sphere, and FIG. 9 shows a hemisphere HS as an example. Specifically, the curvature radius of the spherical surface SS of the hemisphere HS may range from 0.002 mm to 0.05 mm, the radius R1 of the hemisphere HS may range from 5 μm to 500 μm, and the height H1 of the hemisphere HS may range from 10 μm to 200 μm. In another embodiment, as shown in FIG. 10, each optical microstructure 1310d may include a cone C. Further, the curvature radius of the conical surface CS of the cone C may range from 0.002 mm to 0.05 mm, the radius R2 of the bottom surface of the cone C may range from 5 μm to 500 μm, and the height H2 of the cone C may range from 10 μm to 200 μm. It can be understood that the present invention does not impose any restrictions on the shape, arrangement, and specific dimensions of the optical microstructure.

Referring to FIGS. 1 and 2 together, in this embodiment, the light source groove 113 of the reflective element 110 may have a bottom portion 1131 and a reflective portion 1132. The bottom portion 1131 is opposite to the light-emitting outlet O and is suitable for the arrangement of the light-emitting element 120. The reflective portion 1132 is located between the light-emitting outlet O and the bottom portion 1131 and is suitable for surrounding the light-emitting element 120. Specifically, the reflective portion 1132 can reflect the light beam L generated by the light-emitting element 120. For example, the reflective element 110 of this embodiment may include a plurality of reflective pieces, and the reflective pieces can be connected to each other to form the reflective portion 1132. Further, the material of the reflective piece may include metal, but the present invention is not limited thereto. In an embodiment, the material of the reflective element 110 may include reflective glue, and the reflective glue can be formed into the reflective element 110 and the reflective portion 1132 through injection molding or hot pressing. In another embodiment, the reflective portion 1132 may be formed by a reflective layer arranged on the reflective element 110. The present invention does not impose any restrictions on the material and manufacturing process of the reflective element 110 and the reflective portion 1132. In addition, the bottom portion 1131 in this embodiment can reflect the light beam L to increase the light utilization rate. The features of the bottom portion 1131 are similar to those of the reflective portion 1132, and no redundant detail is to be given herein.

Compared with the conventional technologies, the backlight module 100 of this embodiment adopts a reflective element 110 and a light diffusion plate 130. After being incident onto the reflective elements 110, the light beams L generated by the light-emitting elements 120 can be reflected by the reflective elements 110 at a smaller light-emitting angle. In addition, because the distance D between the first surface 111 of the light diffusion plate 130 and the reflective element 110 is 1 mm to 4 mm, the light beam L emitted from the reflective element 110 is incident onto the light diffusion plate 130 at a small angle, thus reducing the angle at which the light beam L is emitted from the light diffusion plate 130. Based on the foregoing structure, the backlight module 100 of this embodiment has the advantages of a small light-emitting angle and uniform light-emitting brightness, thereby increasing the bright-dark contrast ratio when the backlight module 100 performs local dimming.

It is worth mentioning that the backlight module 100 may further include, for example, a support element 140. The support element 140 is fixed to the reflective element 110 and abuts against the light diffusion plate 130 so that there is a distance D between the light diffusion plate 130 and the first surface 111. Specifically, one side of the support element 140 may be fixed to the reflective element 110 and the other side of the support element 140 can be used for placing the light diffusion plate 130 to maintain the distance D between the light diffusion plate 130 and the first surface 111. Specifically, the first surface 111 can have an outer edge OE, and the outer edge OE surrounds the light-emitting outlet O. For example, the outer edge OE in this embodiment surrounds all the light-emitting outlets O. The support element 140 may be fixed to the reflective element 110 along the outer edge OE. For example, the support element 140 may be fixed to the outer surface OS (shown in FIG. 1) of the reflective element 110 along the outer edge OE, but the present invention does not impose any restrictions on the fixed position of the support element 140. In addition, in this embodiment, the support element 140 extends continuously along the outer edge OE to form a frame shape, for example. However, in an embodiment, the support element 140 may be segmented along the outer edge OE. In another embodiment, the support element 140 may be disposed at a corner of the outer edge OE, but the present invention does not impose any restrictions on the specific shape of the support element 140.

Incidentally, the support element 140 and the reflective element 110 may be formed integrally or separately. For example, in this embodiment, the support element 140 and the reflective element 110 are formed separately, and the support element 140 may be fixed to the reflective element 110 through bonding. In an embodiment, the support element 140 and the reflective element 110 are formed integrally, and the support element 140 and the reflective element 110 can be formed together through injection molding or hot pressing. In another embodiment, the support element 140 and the reflective element 110 are formed integrally, where the reflective element 110 may be formed through injection molding or hot pressing, and then the support element 140 is fixed to the reflective element 110 through a similar process. The material of the support element 140 in this embodiment may include rubber, but the other embodiments are not limited thereto. For example, in an embodiment, the material of the support element 140 and the reflective element 110 may include polycarbonate (PC), polypropylene (PP), polyethylene terephthalate (PET), or polyethylene (PE), and the present invention does not impose any restrictions on this. It should be noted that regardless of whether the support element 140 and the reflective element 110 are formed integrally or separately, the support element 140 and the reflective element 110 may be made of different materials. That is, the present invention does not limit whether the material of the support element 140 and the reflective element 110 are the same.

Still referring to FIG. 1, the backlight module 100 in this embodiment further includes, for example, an optical film 150. The optical film 150 is disposed on a side of the light diffusion plate 130 facing away from the reflective element 110. Specifically, the optical film 150 may be disposed opposite to the light emitting surface 131. The number of the optical films 150 can be plural, and the optical films 150 can include brightness enhancement film, light splitting film, diffusion film, etc. In an embodiment, the optical film 150 may further include a wavelength conversion film and a color filter film, and the present invention does not impose any restrictions on the type and quantity of the optical film 150.

Figure 11:
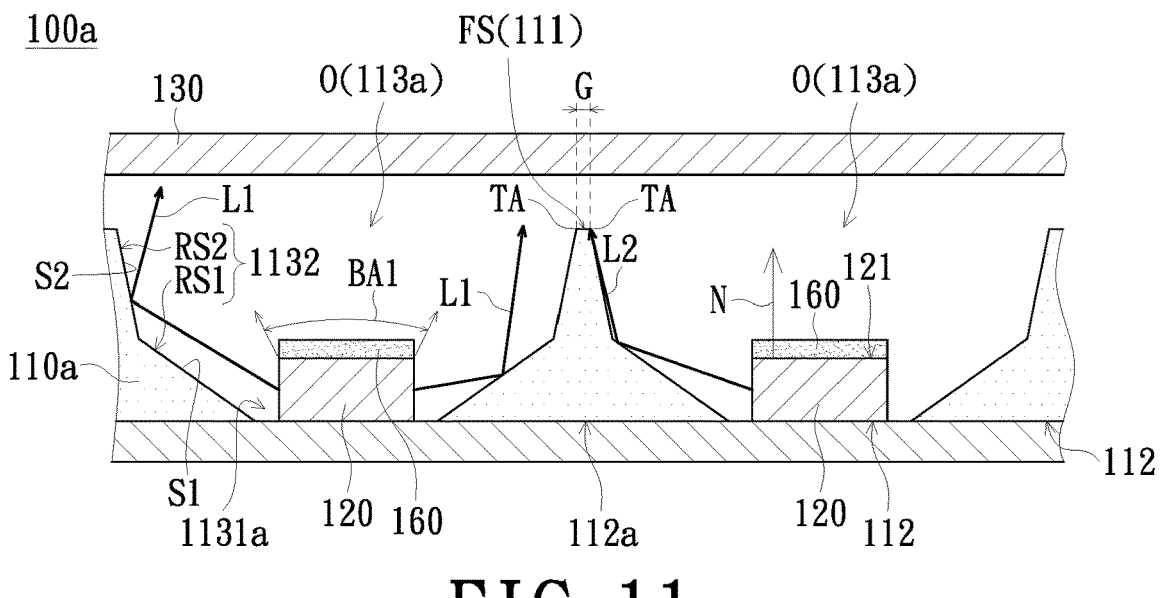
FIG. 11 is a schematic cross-sectional view of a backlight module according to another embodiment of the present invention.

FIG. 11 is a schematic cross-sectional view of a backlight module according to another embodiment of the present invention. The structure and advantages of the backlight module 100a in this embodiment are similar to those in the embodiment of FIG. 1, and the following only describes the differences. Referring to FIG. 11, the reflective portion 1132 of the light source groove 113a includes, for example, a first reflective surface RS1 and a second reflective surface RS2. The first reflective surface RS1 is located between the second reflective surface RS2 and the bottom portion 1131a, and the second reflective surface RS2 is located between the first reflective surface RS1 and the light-emitting outlet O. The slope S1 of the first reflective surface RS1 relative to the second surface 112a may be smaller than the slope S2 of the second reflective surface RS2 relative to the second surface 112a. In this way, the reflective element 110a can further reduce the angle at which the light beam L1 is emitted from the light-emitting outlet O, thereby further reducing the light emitting angle of the backlight module 100a and further improving the bright-dark contrast ratio of the backlight module 100a when performing local dimming.

In this embodiment, the first reflective surface RS1 and the second reflective surface RS2 each may include a plane, and the second surface 112 of the reflective element 110a may be, for example, a plane. The first reflective surface RS1 and the second reflective surface RS2 each can tilt with respect to the second surface 112. In an embodiment, the slope S1 of the first reflective surface RS1 is, for example, 0 to 1.5, so the angle at which the light beam L1 is emitted from the light-emitting outlet O can be reduced. In another embodiment, the slope S1 of the first reflective surface RS1 may be 0. In other words, the first reflective surface RS1 is, for example, a plane substantially parallel to the second surface 112 and located at the bottom portion 1131a of the light source groove 113a to increase the light utilization rate, thus increasing the light-emitting brightness of the reflective element 110a. In addition, in another embodiment, the second reflective surface RS2 can be adjacent to the light-emitting outlet O, and the second reflective surface RS2 may be perpendicular to the second surface 112. In other words, the slope S2 of the second reflective surface RS2 may be infinite so that the second reflective surface RS2 is substantially perpendicular to the second surface 112. It can be understood that although the reflective portion 1132 of this embodiment is exemplified by having two reflective surfaces (i.e., the first reflective surface RS1 and the second reflective surface RS2), the present invention does not impose any restrictions on the quantity of the reflective surfaces. For example, in an embodiment, the reflective portion 1132 may include more than three reflective surfaces, and the slope of each reflective surface with respect to the second surface 112 can gradually increase from the side in the light source groove 113a close to the bottom portion 1131a to the light-emitting outlet O. In another embodiment, the reflective portion 1132 may include more than three reflective surfaces, and the slopes of the reflective surfaces with respect to the second surface 112 can be staggered in magnitude in the direction from the bottom portion 1131a of the light source groove 113a to the light-emitting outlet O. Incidentally, the bottom portion 1131a of this embodiment may be provided with an opening, and the light-emitting element 120 may be disposed in the opening. However, the present invention does not impose any restrictions on the specific features of the bottom portion 1131a.

It is worth mentioning that in this embodiment, there is a spacing G between the two adjacent light-emitting outlets O on the first surface 111, and the spacing G may be 0.01 mm to 2 mm. Specifically, the spacing G can further prevent the light beam L2 emitted from one of the light-emitting outlets O from passing above the another adjacent light-emitting outlet O. In this way, the reflective element 110a can further reduce the interference of the light beams emitted from the bright region on the dark region when the backlight module 100a performs local dimming, thus further increasing the bright-dark contrast ratio when the backlight module 100a performs local dimming. In this embodiment, the part of the first surface 111 located between the two adjacent light-emitting outlets O is, for example, a plane FS, and there may be sharp angles TA between the plane FS and the two adjacent reflective portions 1132 (e.g., the two adjacent first reflective surfaces RS1). Specifically, the two sharp angles TA can block more light beams (e.g., light beams L2) intending to exit the light-emitting outlet O at a larger angle, thereby reducing the angle at which light beams are emitted from the light-emitting outlet O and increasing the bright-dark contrast ratio when the backlight module 100a performs local dimming. However, in an embodiment, the part of the first surface 111 located between the two adjacent light-emitting outlets O is, for example, a curved surface. Specifically, the curved surface can reflect light beams more uniformly, and thus the light-emitting brightness of the reflective element 110a can be more uniform and therefore have the advantage of being easy to process. The curvature radius of the curved surface is, for example, 0.01 mm to 2 mm, but the present invention does not impose any restrictions on the curvature radius. Incidentally, the curved surface is formed by, for example, polishing the plane FS, but the present invention does not impose any restrictions on the processing manner.

Figure 12:
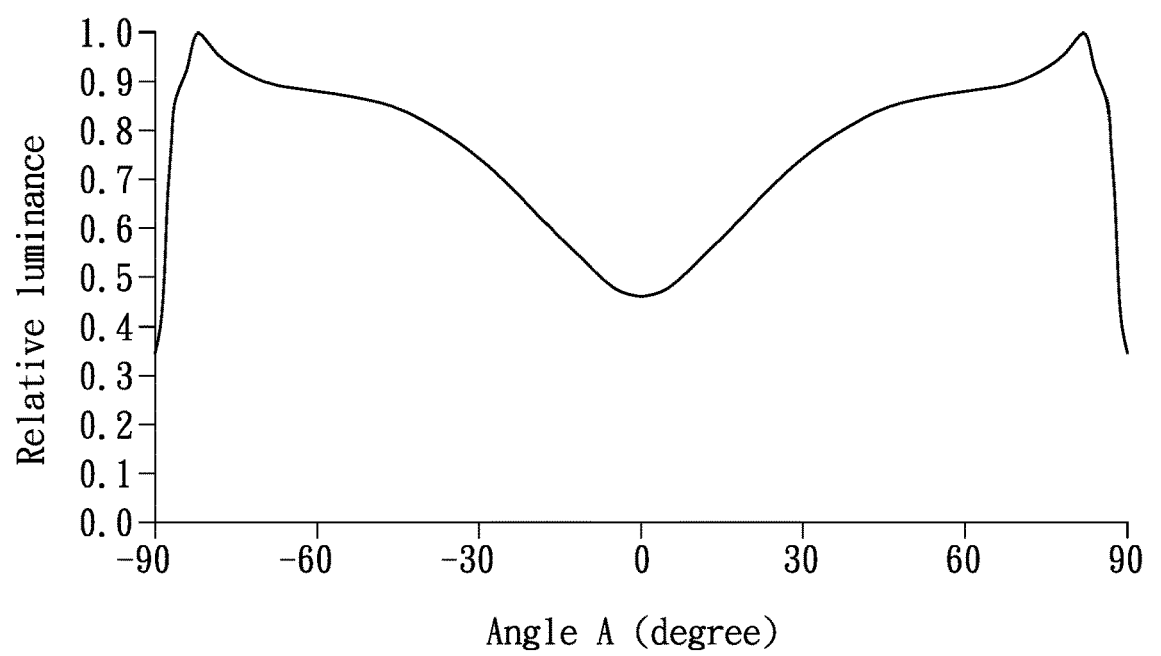
FIG. 12 is a schematic diagram of the light distribution of the light-emitting element in FIG. 11.
Figure 13:
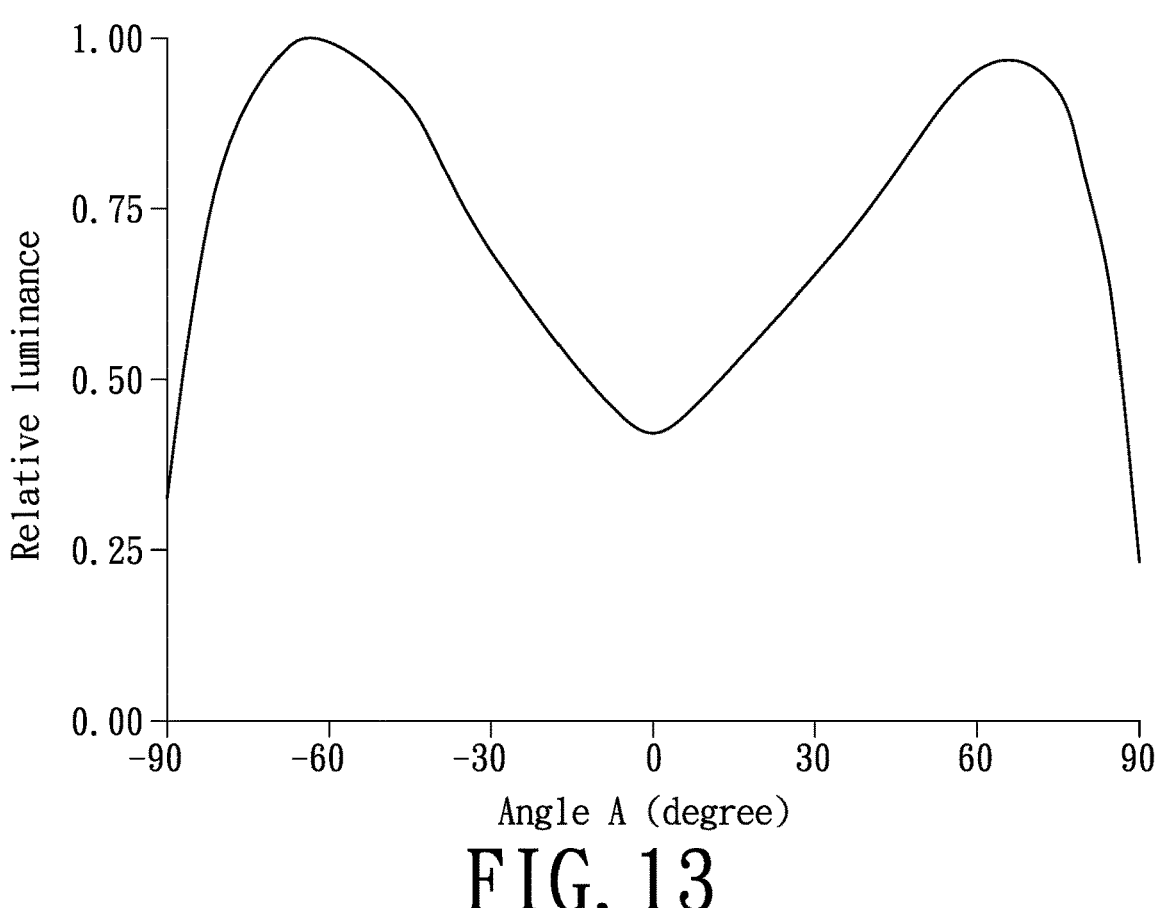
FIG. 13 is a schematic diagram of light distribution of a light-emitting element of a backlight module according to another embodiment of the present invention.

FIG. 12 is a schematic diagram of a light pattern distribution of the light-emitting element in FIG. 11. Referring to FIGS. 11 and 12, in this embodiment, the included angle A between a peak angle of the luminance of the light-emitting element 120 and the normal vector N is, for example, 50 degrees to 90 degrees. In an embodiment, the included angle A may be 70 degrees to 90 degrees, and 80 degrees, for example. In this way, the light beam L1 generated by the light-emitting element 120 can be emitted from the light-emitting outlet O at a smaller angle after the light beam L1 is reflected by the first reflective surface RS1 and the second reflective surface RS2, thereby increasing the bright-dark contrast ratio when the backlight module 100a performs local dimming. In another embodiment, as shown in FIG. 13, the included angle A may be 50 degrees to 70 degrees to further improve the bright-dark contrast ratio when the backlight module 100a performs local dimming. Still referring to FIG. 11, in this embodiment, the beam angle BA1 of each light-emitting element 120 is, for example, 140 degrees to 180 degrees. In this way, the bright-dark contrast ratio can be further improved when the backlight module 100a performs local dimming.

Incidentally, the backlight module 100a of this embodiment may further include a plurality of light-blocking elements 160, and each light-blocking element 160 is disposed on the top surface 121 of the respective light-emitting element 120, such that the included angle A may be 50 degrees to 90 degrees. For example, the light-blocking element 160 may include a light-blocking cover or a distributed bragg reflector (DBR), but the other embodiments are not limited thereto.

Figure 14:
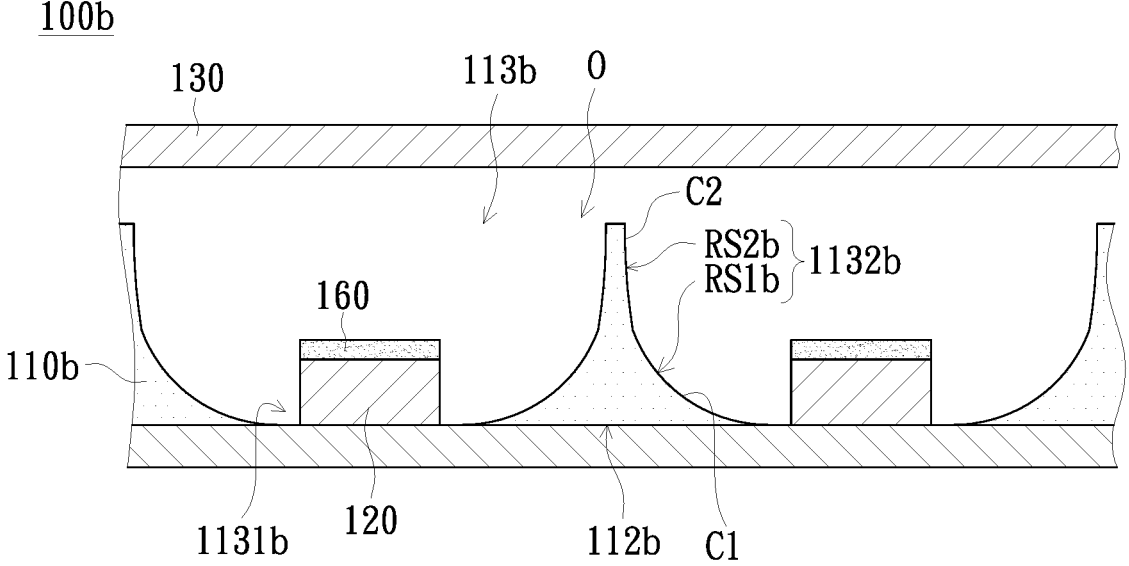
FIG. 14 is a schematic cross-sectional view of a backlight module according to another embodiment of the present invention.

FIG. 14 is a schematic cross-sectional view of a backlight module according to another embodiment of the present invention. The structure and advantages of the backlight module 100b of this embodiment are similar to those in the embodiment of FIG. 11, and the following only describes the differences. Referring to FIG. 14, the curvature C1 of the first reflective surface RS1b may be greater than the curvature C2 of the second reflective surface RS2b. For example, in an embodiment, the curvature C2 of the second reflective surface RS2b may be close to 0; in other words, the second reflective surface RS2b may be substantially perpendicular to the second surface 112b of the reflective element 110b. In the same way, in addition to the first reflective surface RS1b and the second reflective surface RS2b, the reflective portion 1132b may further include more reflective surfaces. For example, in an embodiment, the reflective portion 1132b may include more than two reflective surfaces, and the curvature of each reflective surface gradually decreases from the side of the light source groove 113b close to the bottom portion 1131b to the light-emitting outlet O. Similarly, in this embodiment, the peak angle of the luminance of the light-emitting element 120 may be 50 degrees to 90 degrees, and the peak angle of the light-emitting element 120 can be approximately within the above range through the light-blocking element 160. However, the present invention does not impose any restrictions on the means of changing the peak angle of the light-emitting element 120.

In summary, the backlight module of the present invention adopts a reflective element and a light diffusion plate. After being incident onto the reflective elements, the light beams generated by the light-emitting elements can be reflected by the reflective elements at a smaller light-emitting angle. In addition, because the distance between the first surface of the light diffusion plate and the reflective element is 0.5 mm to 4 mm, the light beam emitted from the reflective element is incident onto the light diffusion plate at a small angle, thus reducing the angle at which the light beam is emitted from the light diffusion plate. Based on the foregoing structure, the backlight module of the present invention has the advantages of a small light-emitting angle and uniform light-emitting brightness, thereby increasing the bright-dark contrast ratio when the backlight module performs local dimming.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module, comprising:
   a reflective element, having a first surface, a second surface, and a plurality of light source grooves, wherein the first surface is opposite to the second surface, the light source grooves extend from the first surface to the second surface, and each of the light source grooves has a light-emitting outlet on the first surface;
   a plurality of light-emitting elements, respectively disposed in the light source grooves; and
   a light diffusion plate, disposed opposite to the first surface, wherein a distance between the light diffusion plate and the first surface is 0.5 mm to 4 mm;
   the backlight module further comprising a support element, wherein the support element is fixed to the reflective element and abuts against the light diffusion plate so that the distance is formed between the light diffusion plate and the first surface;
   wherein the first surface has an outer edge, the outer edge surrounds the light-emitting outlets, and the support element is fixed to the reflective element along the outer edge;
   wherein the support element comprises a plurality of segments along the outer edge and separated from each other, and a gap is formed between the two segments next to each other;
   wherein the light diffusion plate has a light emitting surface and a light incident surface, the light emitting surface faces away from the first surface and is opposite to the light incident surface, and the light emitting surface and/or the light incident surface comprises a plurality of optical microstructures;
   wherein the light diffusion plate further has a plurality of diffusion areas, and each of the diffusion areas has eight of the optical microstructures surrounding and adjacent to a point of the diffusion area, a shape of each of the optical microstructures comprises a triangular pyramid, and each of the optical microstructures has an inclined surface, the inclined surface stands on the light emitting surface and/or the light incident surface and is inclined with respect to the light emitting surface and the light incident surface, wherein two inclined surfaces of each adjacent microstructure face each other and form a connection line, an included angle is formed between the two inclined surfaces and the included angle ranges from 30 degrees to 150 degrees, and the connection lines of all the optical microstructures intersect at the point.

2. The backlight module according to claim 1, wherein the support element and the reflective element are formed integrally or separately.

3. The backlight module according to claim 2, wherein a material of the support element and the reflective element comprises rubber, polycarbonate, polypropylene, polyethylene terephthalate, or polyethylene.

4. The backlight module according to claim 1, wherein each of the light source grooves comprises a bottom portion and a reflective portion, the bottom portions are respectively opposite to the light-emitting outlets and are suitable for arranging the light-emitting elements, the reflective portion is located between the light-emitting outlet and the bottom portion and is suitable for surrounding the light-emitting element, the reflective portion comprises a first reflective surface and a second reflective surface, the first reflective surface is located between the second reflective surface and the bottom portion, the second reflective surface is located between the first reflective surface and the light-emitting outlet, a slope of the first reflective surface with respect to the second surface is smaller than a slope of the second reflective surface with respect to the second surface, or a curvature of the first reflective surface is greater than a curvature of the second reflective surface.

5. The backlight module according to claim 1, wherein each of the light-emitting elements has a top surface and a bottom surface, the top surfaces are opposite to the bottom surfaces, the top surfaces respectively face the light-emitting outlets, each of the top surfaces has a normal vector, an included angle between a peak angle of luminance of each of the light-emitting elements and the normal vector is 50 degrees to 90 degrees, and a beam angle of the light-emitting elements is 140 degrees to 180 degrees.

6. The backlight module according to claim 5, further comprising a plurality of light-blocking elements, wherein the light-emitting element has a top surface and a bottom surface, the top surface is opposite to the bottom surface and faces the light-emitting outlet, and the light-blocking elements are disposed on the top surface.

7. The backlight module according to claim 1, wherein each of the light-emitting elements has a top surface and a bottom surface, the top surfaces are opposite to the bottom surfaces, respectively face the light-emitting outlets and each have a normal vector, an included angle between a peak angle of luminance of the light-emitting element and the normal vector is-5 degrees to 5 degrees, and a beam angle of the light-emitting element is 120 degrees to 140 degrees.

8. The backlight module according to claim 1, wherein there is a spacing between the two adjacent light-emitting outlets in the first surface, and the spacing is 0.01 mm to 2 mm.

9. The backlight module according to claim 1, further comprising an optical film, wherein the optical film is disposed on a side of the light diffusion plate facing away from the reflective element.

* * * * *